(12) United States Patent
Teicher

(10) Patent No.: US 9,483,208 B2
(45) Date of Patent: Nov. 1, 2016

(54) SYSTEM AND METHOD OF DIGITAL CONTENT MANIPULATION

(71) Applicant: SANDISK IL LTD., Kfar Saba (IL)

(72) Inventor: Mordechai Teicher, Hod Hasharon (IL)

(73) Assignee: SANDISK IL LTD., Kfar Saba (IL)

( * ) Notice: Subject to any disclaimer, the term of this patent is extended or adjusted under 35 U.S.C. 154(b) by 0 days.

(21) Appl. No.: 14/138,898

(22) Filed: Dec. 23, 2013

(65) Prior Publication Data
US 2014/0115286 A1     Apr. 24, 2014

Related U.S. Application Data

(63) Continuation of application No. 11/727,987, filed on Mar. 29, 2007, now abandoned.

(60) Provisional application No. 60/744,277, filed on Apr. 5, 2006, provisional application No. 60/803,135, filed on May 25, 2006.

(51) Int. Cl.
| | | |
|---|---|---|
| *G11B 21/08* | (2006.01) | |
| *G06F 3/06* | (2006.01) | |
| *G11B 27/10* | (2006.01) | |
| *G11B 27/031* | (2006.01) | |

(Continued)

(52) U.S. Cl.
CPC .......... *G06F 3/0659* (2013.01); *G06F 3/0604* (2013.01); *G06F 3/0683* (2013.01); *G11B 27/031* (2013.01); *G11B 27/105* (2013.01); *G11B 27/11* (2013.01); *G11B 27/329* (2013.01); *G11B 2220/41* (2013.01); *G11B 2220/65* (2013.01); *G11B 2220/657* (2013.01)

(58) Field of Classification Search
USPC ......... 369/30.07, 30.08, 30.09, 30.06, 30.05, 369/30.19, 83, 84, 14; 360/13, 15; 711/161, 711/162

See application file for complete search history.

(56) References Cited

U.S. PATENT DOCUMENTS

| | | | | |
|---|---|---|---|---|
| 5,119,353 A | * | 6/1992 | Asakura ................. | A63F 13/10 369/13.01 |
| 5,822,291 A | * | 10/1998 | Brindze et al. ................. | 369/14 |
| 6,044,046 A | * | 3/2000 | Diezmann ............... | G06F 21/80 369/14 |

(Continued)

FOREIGN PATENT DOCUMENTS

| | | |
|---|---|---|
| CN | 1381055 | 11/2002 |
| EP | 0251177 A2 | 1/1988 |

(Continued)

OTHER PUBLICATIONS

International Search Report mailed Oct. 9, 2007 in International Application No. PCT/IL2007/000415, 3 pages.

(Continued)

*Primary Examiner* — Tan X Dinh
(74) *Attorney, Agent, or Firm* — Toler Law Group, PC

(57) ABSTRACT

A data storage apparatus includes a primary storage device and a secondary storage device. The primary storage device includes a first non-volatile memory to store a content item. The secondary storage device includes a second non-volatile memory to store a command received from a first content appliance. The command indicates an operation to be performed with respect to the content item stored at the primary storage device. The secondary storage device is configured to send the command to a second content appliance for execution.

23 Claims, 6 Drawing Sheets

(51) Int. Cl.
*G11B 27/11* (2006.01)
*G11B 27/32* (2006.01)

(56) References Cited

U.S. PATENT DOCUMENTS

| | | | |
|---|---|---|---|
| 6,243,328 B1 | 6/2001 | Fenner et al. | |
| 6,339,561 B2 | 1/2002 | Yokota et al. | |
| 6,501,718 B1* | 12/2002 | Ono | G11B 19/12 369/14 |
| 6,542,444 B1* | 4/2003 | Rutsche | G06K 19/044 235/454 |
| 6,938,121 B2* | 8/2005 | Shigetomi | G06F 3/0607 369/14 |
| 7,876,647 B2 | 1/2011 | Shinkai et al. | |
| 8,565,051 B2* | 10/2013 | Matsushita et al. | 369/30.05 |
| 2002/0021902 A1 | 2/2002 | Hosoda et al. | |
| 2002/0146232 A1* | 10/2002 | Harradine | G06F 17/30817 386/245 |
| 2003/0016609 A1* | 1/2003 | Rushton et al. | 369/53.2 |
| 2003/0081935 A1 | 5/2003 | Kirmuss | |
| 2003/0131253 A1* | 7/2003 | Martin et al. | 713/200 |
| 2003/0135704 A1* | 7/2003 | Martin | 711/162 |
| 2004/0008970 A1* | 1/2004 | Junkersfeld et al. | 386/69 |
| 2004/0066308 A1 | 4/2004 | Sampsell | |
| 2004/0179449 A1* | 9/2004 | McGoldrick | 369/53.22 |
| 2005/0134939 A1 | 6/2005 | Ikeda et al. | |
| 2005/0152670 A1 | 7/2005 | Skaar | |
| 2005/0157600 A1* | 7/2005 | Teicher | G11B 7/00736 369/30.03 |
| 2005/0185547 A1 | 8/2005 | Nagai et al. | |
| 2005/0225799 A1 | 10/2005 | Berarducci et al. | |
| 2006/0015826 A1 | 1/2006 | Shiozawa et al. | |
| 2006/0015893 A1 | 1/2006 | Kitsukawa et al. | |
| 2006/0039260 A1* | 2/2006 | Hirasawa | 369/53.21 |
| 2006/0067171 A1 | 3/2006 | Elmers, II et al. | |
| 2006/0161928 A1 | 7/2006 | Douglass et al. | |
| 2006/0164931 A1 | 7/2006 | Kim et al. | |
| 2006/0176512 A1 | 8/2006 | Nishimura | |
| 2006/0190975 A1 | 8/2006 | Gonzalez | |
| 2006/0227672 A1* | 10/2006 | Imanishi | 369/30.05 |
| 2006/0271588 A1 | 11/2006 | Tanaka | |
| 2007/0003168 A1 | 1/2007 | Oliver | |
| 2007/0183271 A1* | 8/2007 | Ashizaki | G11B 20/00275 369/14 |
| 2007/0211644 A1 | 9/2007 | Ottamalika et al. | |
| 2008/0181080 A1* | 7/2008 | White et al. | 369/84 |
| 2008/0307450 A1* | 12/2008 | Kahlman | G06K 19/04 720/723 |

FOREIGN PATENT DOCUMENTS

| | | |
|---|---|---|
| EP | 0626689 A2 | 11/1994 |
| EP | 0874519 A2 | 10/1998 |
| WO | 0175886 A1 | 10/2001 |

OTHER PUBLICATIONS

International Preliminary Report on Patentability for International Application No. PCT/IL2007/000415, issued Oct. 8, 2008, 7 pages.
English translation of Office Action mailed Apr. 28, 2010 in Chinese Application No. 200780018434.2, 6 pages.
Non-Final Office Action mailed Jul. 21, 2010 in U.S. Appl. No. 11/727,987, 10 pages.
Final Office Action mailed Mar. 14, 2011 in U.S. Appl. No. 11/727,987, 14 pages.
Non-Final Office Action mailed Jun. 23, 2011 in U.S. Appl. No. 11/727,987, 18 pages.
Office Action mailed Dec. 9, 2011 in Chinese Application No. 200780018434.2 with English translation, 9 pages.
Non-Final Office Action mailed Dec. 23, 2011 in U.S. Appl. No. 11/727,987, 8 pages.
Final Office Action mailed Jul. 6, 2012 in U.S. Appl. No. 11/727,987, 9 pages.
Non-Final Office Action mailed May 16, 2013 in U.S. Appl. No. 11/727,987, 9 pages.
Office Action mailed Jul. 11, 2013 in Korean Application No. 10-2008-7025383 with English Translation, 8 pages.
Notice of Allowance and Fee(s) Due mailed Sep. 27, 2013 in U.S. Appl. No. 11/727,987, 9 pages.

* cited by examiner

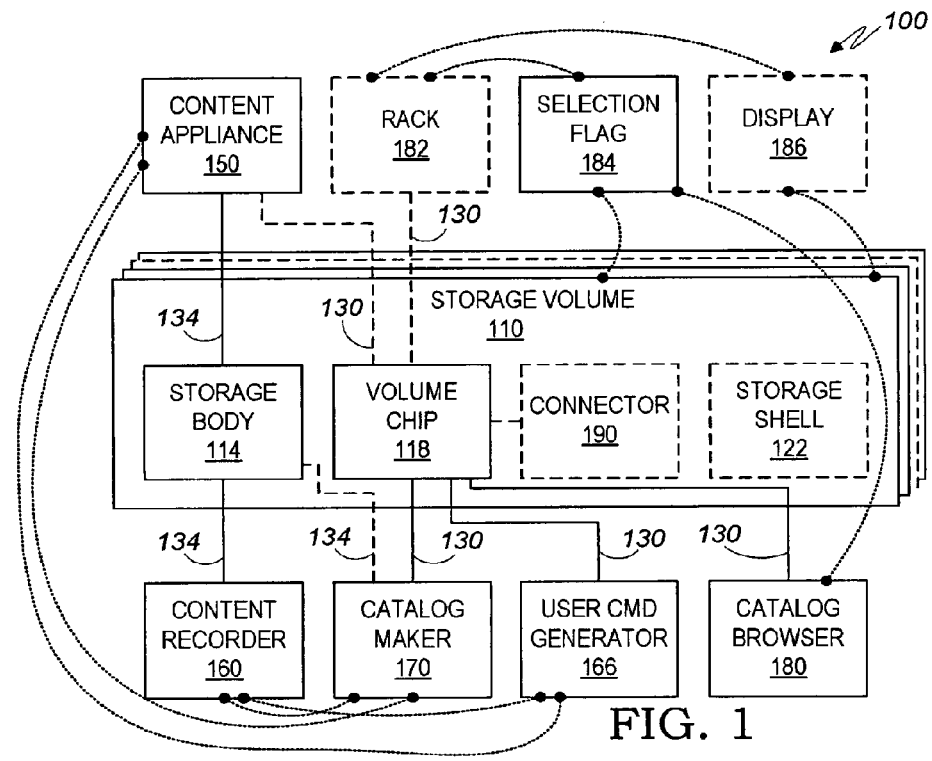
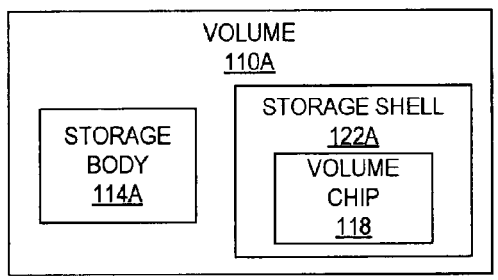
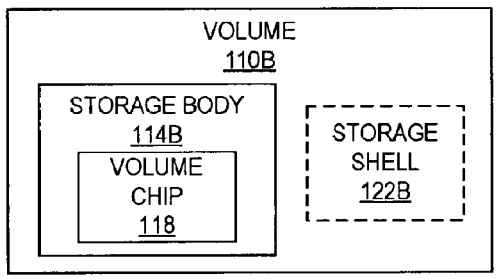
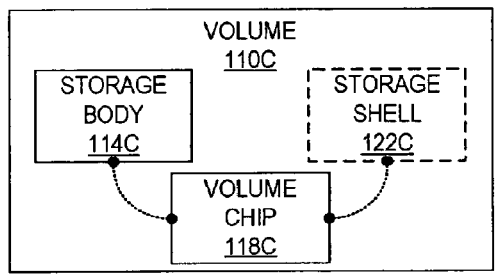
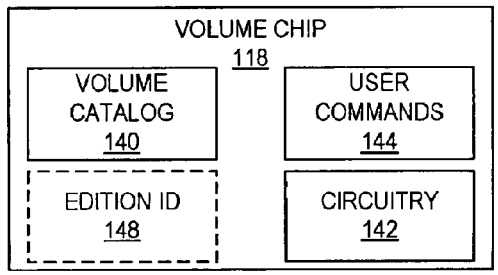
FIG. 1
FIG. 1A
FIG. 1B
FIG. 1C
FIG. 1D

SYSTEM AND METHOD OF DIGITAL CONTENT MANIPULATION

CROSS-REFERENCE TO RELATED APPLICATIONS

This patent application is a continuation application of and claims priority to U.S. patent application Ser. No. 11/727,987, filed Mar. 29, 2007, which claims priority to U.S. Provisional Patent Application No. 60/744,277, filed Apr. 5, 2006, and to U.S. Provisional Patent Application No. 60/803,135, filed May 25, 2006. The content of each of the aforementioned applications is incorporated by reference herein in its entirety.

FIELD OF THE DISCLOSURE

The present disclosure is generally related to cataloging digital content stored on removable storage devices.

BACKGROUND

With advances in technology, more and more content is stored today on removable storage devices. Consumers produce digital contents such as still photos, video movies, voice recordings and personal documents; organizations produce digital files containing designs, software, literature, marketing materials, legal documents, correspondence documentation, databases etc. Content providers distribute movies, music, audio books, digital books, reference material, software, fonts, clips art and the like on digital media. A vast variety of digital content is available via the Internet or cellular networks to be downloaded onto CDs and DVDs.

Removable storage devices are not limited to digital technologies. Many still own collections of vinyl records, audio cassettes and VHS tapes, and such removable storage devices are still used by both users and commercial providers.

A user interested in executing an action with respect to a specific content piece on a content appliance, such as a computer, a CD burner or a printer, must either engage the respective storage device with the content appliance and manually enter the appropriate commands, or the user must provide written instructions to another human operator for executing the action. For example, a user who wishes to burn the content of a memory card on a CD using a CD burner, needs to insert the card into a card reader, a CD into the CD burner and operate the respective personal computer to initiate the burning operation. The burning operation will not be applied if the user does not specifically operate the CD burner as such.

With time, a content collection of an individual user can number hundreds of volumes, and collections of an organization or a professional (for example, a photographer) can exceed thousands of volumes. Thus, to execute action regarding a content piece, the user must first spend a non-negligible amount of time searching for the specific content piece to find the related volume for every action separately, and then manually execute the desired action with respect to each content piece.

Eastman Kodak Company of Rochester, N.Y. marketed a KODAK DC290 Zoom Digital Camera™, which allows users to assign printing instructions to pictures stored in a memory card when cataloging their content collections. The printing instructions are saved in the memory card with the marked pictures.

Although the Kodak camera enables a user to store printing instructions for pictures, the instructions must be stored in the same storage device in which the associated pictures reside. The user does not have the option of storing the printing instructions and the associated pictures in separate storage devices. Furthermore, the user does not have the option of storing other processing instructions (and not only printing instructions) for applying other content manipulation. Such options missing from the prior art are a constraint on use. Furthermore, such instruction options are unavailable for other storage media, such as CDs that already include digital content and cannot be have additional data stored thereon.

Thus, it would be useful for a user to be able to store processing instructions including but not limited to printing instructions in a storage device, which is separate from the storage device on which the associated content pieces resides.

SUMMARY

Accordingly, the present disclosure introduces a storage volume having a non-volatile primary storage device for storing digital content and a non-volatile secondary storage device for storing user commands. The primary storage device and the secondary storage device are distinct hardware elements. The secondary storage device may be in form of an electronic chip.

The user commands define processing request regarding the associated content of the storage device. The user commands refer to information associated with how (for example action/process) to use/manipulate selected content pieces that are stored on a storage body of a storage volume. The terms "content" and "content piece" reference machine-readable data coded in digital or analog representation and recorded onto a storage device. The user commands are to be executed with respect to the selected content piece by a compatible content appliance.

The user commands include, for example, displaying, opening, playing, processing, copying to disk, backing up, emailing, printing, publishing to Web, burning to a CD, etc. Non-limiting examples for content include still images, videos (including the associated audio, both user- and commercially-recorded), audio and music recordings (both user- and commercially-recorded), software, documents, databases, and other computer files created, acquired, downloaded or otherwise obtained by a user. Neither the list provided for processing instructions nor the list provided for content is limiting.

Examples for content appliance include a digital camera, a digital voice recorder, a digital video recorder, a personal computer with a CD/DVD reader, a personal computer with a CD/DVD reader/writer, a personal computer with memory card reader/writer, and a gramophone playing a vinyl record.

In accordance with another aspect of the disclosure, the present disclosure is configured to create a catalog as a representation of the digital content of a storage volume by its respective samples. The catalog is stored on the secondary storage device. The term "sample" references a derived data that is representative of that content piece in a way that allows a user to clearly identify the content piece. A "volume catalog" or "catalog" is a representation of content pieces in a volume. Accordingly, a "collection catalog" is a collection of volumes by the samples of the respective content pieces, where typically each sample is pointing at its parent content piece. A volume catalog may be associated with software to assist browsing and searching content pieces through their samples, and locating the parent content piece respective to a selected sample.

Additional features and advantages of the disclosure will become apparent from the following drawings and description.

BRIEF DESCRIPTION OF THE DRAWINGS

For a better understanding of the disclosure with regard to the embodiments thereof, reference is made to the accompanying drawing, in which like numerals designate corresponding sections or elements throughout the present disclosure, and in which:

FIG. 1 is a high level representation of a system for manipulating digital content in accordance with the present disclosure;

FIG. 1A illustrates an embodiment of the volume of FIG. 1 in which the storage body does not have the volume chip;

FIG. 1B illustrates an embodiment of the volume of FIG. 1 in which a volume chip is part of storage body;

FIG. 1C portrays two embodiments of the volume of FIG. 1 in which the volume chip is reversibly attached to either a storage body or to a storage shell;

FIG. 1D illustrates the content of volume chip including circuitry for communication;

DETAILED DESCRIPTION

Figure 2A:
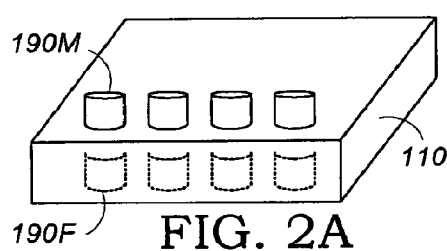
FIG. 2A illustrates exemplary volumes devised for stackable aggregation arrangements.

The disclosure summarized above and defined by the claims below will be better understood by referring to the present detailed description of embodiments of the disclosure. This description is not intended to limit the scope of claims but instead to provide examples of the disclosure. The following discussion presents exemplary embodiments, which include a system for manipulating digital content, a storage volume connectable to a content appliance, and a method of operating a content appliance to interact with a storage volume.

FIG. 1 illustrates an embodiment of the disclosure in which a system 100 for manipulating digital content includes a plurality of storage volumes 110 and a content appliance 150. Content appliance 150 may be a digital camera, a personal computer with a CD/DVD reader, etc. Volume 110 is a stand-alone portable unit that is reversibly connected to a content appliance 150 for reading content therefrom, and optionally for recording content thereon.

A non-volatile primary storage device, storage body 114, is operationally connected (for example, by insertion) to apparatuses for recording or reading content. Non-limiting examples of storage body 114 are optical media such as CDs or DVDs, magnetic media such as a magnetic diskettes or magnetic tape cassettes, solid-state disks such as flash memory disks, and vinyl records. Storage body 114 is a part of volume 110. A storage shell 122 offers protection to storage body 114 and also provides a surface for affixing labels. In some embodiments, storage shell 122 accommodates exactly one optical disk, such as a CD or a DVD. A storage shell and elements affixed thereto (except storage body 114) will be referred to as a "casing."

A hardware element, a volume chip 118, is non-volatile secondary storage device that is distinct from storage body 114 and is another part of volume 110. Volume chip 118 stores user commands, which define processing requests regarding the digital content of storage body 114. Thus, volume 110 carries digital content in storage body 114 and user commands regarding that digital content in volume chip 118. Volume chip 118 may be permanently attached to storage shell 122 or to storage body 114. Alternatively, volume chip 118 may be reversibly attached to one of storage shell 122 and storage body 114.

An appliance, such as content recorder 160, is adapted to communicate with storage body 114. In the case of storage body 114 being a CD or DVD for archiving digital pictures, content recorder 160 may be a personal computer that reads camera memory cards, accumulates the content of the memory cards on its hard disk, and burns multiple pictures onto the CD or DVD. In the case of video recordings, a DVD may be burnt by a content recorder 160 that is either a personal computer, which has previously received a copy of the recording from a video camera, or a video camera, which records movies directly onto a DVD. In the case of storage body 114 being a magnetic video cassette, content recorder 160 may be a video camera that takes the video footage or a video cassette recorder that captures broadcasted content. In the case of storage body 114 being a flash memory disk, content recorder 160 may be a digital video or still camera or a personal computer that has accumulated content. Content recorder 160 may also be a dedicated CD or DVD recorder that records broadcast audio or video content. Content recorder 160 can also be a commercial machine, which produces prerecorded CDs and DVDs in mass production, or other machines, which produce prerecorded VHS tapes, compact audio cassettes or vinyl records.

User command generator 166 is an appliance adapted to communicate with volume chip 118. User command generator 166 compiles or obtains user commands defining processing requests regarding the digital content stored on storage body 114. User command generator 166 records these user commands into volume chip 118. For example, a user may use user command generator 166 for recording user commands for copying some of the content pieces on storage body 114, printing some others, and cropping specific ones prior to printing. Such user commands are recorded into volume chip 118 to be later executed by appropriate content appliances 150.

Catalog maker 170 compiles a volume catalog of the content of storage body 114 and stores it as a volume catalog 140 in the secondary storage device, catalog chip 118 (FIG.

1D). Volume catalog 140 includes a representation of the digital content in storage body 114 by its respective samples. In one embodiment (represented by the flowcharts in FIGS. 4-5), the catalog is prepared offline from already-recorded content that resides in storage body 114. In this embodiment, catalog maker 170 may be a personal computer adapted to communicate with both storage body 114 and volume chip 118. In an alternative embodiment (represented by the flowchart in FIG. 6), the catalog is compiled on-the-fly when respective content is recorded into storage body 114. Then, catalog maker 170 may be consolidated with content recorder 160. Catalog-making uses techniques known in the art for extracting, organizing and presenting samples and meta-data from content, as well as receiving manual user entries or retrieving catalog information from a database. An exemplary cataloging software package known in the art for cataloging digital images is offered by ACD Systems Ltd. of Victoria, British Columbia, Canada. The catalog may include thumbnails of images, video samples, software titles, article abstracts, etc.

If the storage body 114 is an analog type of memory, for example, a VHS tape cassette or a vinyl record, then catalog maker 170 may include a content digitizer circuit or software to digitally process the content pieces to produce the respective samples.

Catalog browser 180 may be a personal computer or a dedicated apparatus adapted to connect to the volume chip 118 of a volume 110 or of each volume 110 of a collection of volumes. Catalog browser 180 allows the user to browse through each of the volume catalogs 140 stored on the respective volume chips 118 (see FIG. 1D) and identify content pieces of interest.

Content appliance 150, which may be a personal computer, music or video player, or a commercial photo printer, is a device that accesses content pieces from storage body 114, preferably according to user commands read from volume chip 118. Thus, a user who has entered user commands into volume chip 118 can then expect the user commands to be carried out by content appliance 150, for example, to show, print or copy images, or to play selected audio or video pieces. Also, in some embodiments or operations, content appliance 150 can cooperate with catalog maker 170 to read the content of storage body 114, to produce a volume catalog, and to record that catalog into volume chip 118.

Volume chip 118 includes a non-volatile random-access memory that contains user commands regarding the content of storage body 114 to be carried out by a content appliance 150. Volume chip 118 may also contain the volume catalog representing the content of storage body 114 and previously or presently created by a catalog maker 170.

It will be noted that content recorder 160, user command generator 166, catalog maker 170, catalog browser 180 and content appliance 150 are functional units that can be implemented as a variety of devices that offer other functionalities as well. These functional units may be embodied as two distinct appliances, such that one of these appliances adapted to transmit user commands to storage body 114 and the other appliance is adapted to initiate the processing of the user commands of the content storage body 114. These functional units may also be consolidated and embodied as a single appliance. For example, the functional units may be consolidated into a single personal computer adapted to communicate with both storage body 114 and volume chip 118 for all related operations of content recorder 160, catalog maker 170, catalog browser 180 and content appliance 150.

Interface 134 is a typical interface selected according to the nature of storage body 114. Accordingly, if storage body 114 is a CD or DVD disk, interface 134 includes a CD/DVD drive, communication bus and appropriate drivers. If storage body 114 is a digital video cassette, then interface 134 includes a compatible drive of a video camera or a dedicated DV cassette drive, communication bus and appropriate drivers. If storage body 114 is a flash memory card, then interface 134 includes a compatible card reader, communication bus and appropriate drivers. If storage body 114 is a vinyl record, interface 134 between storage body 114 and content appliance 150 and catalog maker 170 includes a gramophone and wiring and analog interface for receiving electrical signals representing music, and interface 134 between content recorder 160 and storage body 114 includes the machinery used for mastering and pressing vinyl records.

Communication interface 130 enables communication between volume chip 118 and user command generator 166, catalog maker 170, catalog browser 180, content appliance 150 and an optional rack 182 (discussed below). Interface 130 is adapted to support random access to the catalog, as well as the simultaneous connection of a plurality of volumes to form a single collection, in a way that all volume catalogs are accessible from one point to effectively form a collection catalog. Interface 130 can use hard-wired buses, or a hybrid arrangement where power is supplied via a physical connection while communication is made wirelessly (RF such as Bluetooth or Wireless USB, or IR), or a full wireless connection where volume chip 118 is both energized and communicated electromagnetically using techniques known in the art as RFID (for example, under ISO 14443 standard).

Under usual circumstances, volumes 110 are connected individually to content recorder 160, to user command generator 166, to catalog maker 170 and to content appliance 150, while often the connection to catalog browser 180 is made as an aggregate form of volumes 110, for accessing a collection catalog for example. However, browsing with catalog browser 180 is also useful for an individual volume 110, for example, when one wants to quickly determine the content of a CD without inserting it to the CD drive.

Figure 3A:
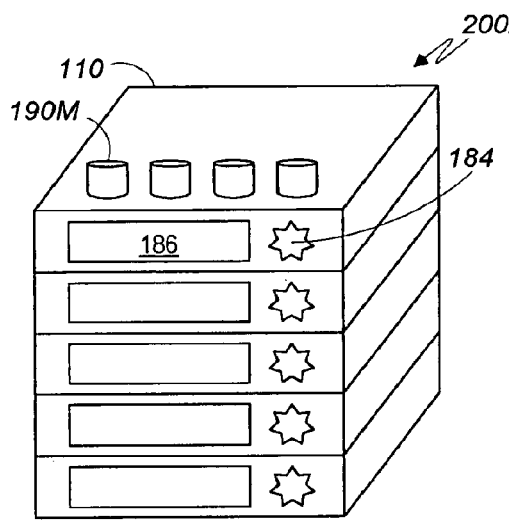
FIG. 3A illustrates a stackable aggregation arrangement to accommodate a plurality of volumes of the type shown in FIG. 2A.
Figure 3B:
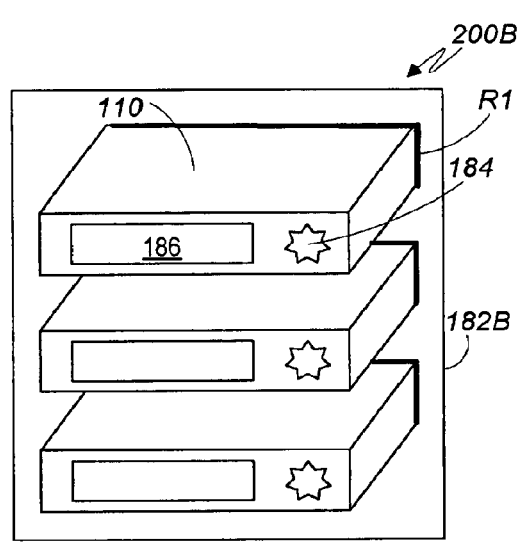
FIG. 3B illustrates a rackable aggregation arrangement to accommodate a plurality of volumes of the type shown in FIG. 2B.
Figure 3C:
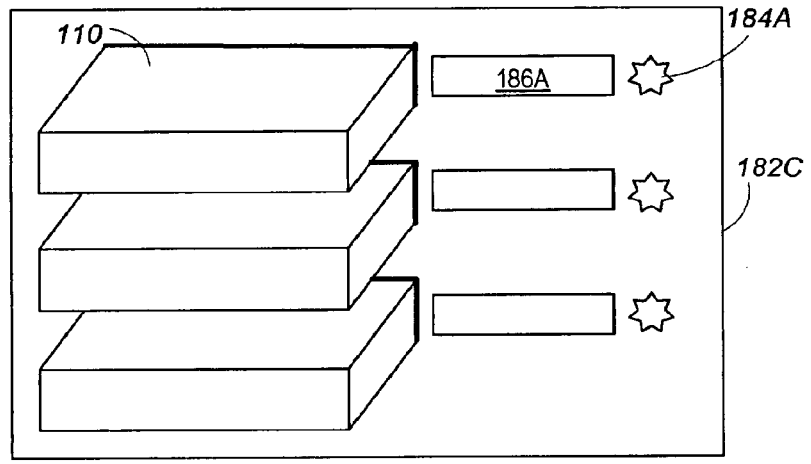
FIG. 3C illustrates a rackable aggregation arrangement according to another embodiment.

Rack 182 is one of the aggregation arrangements of the present disclosure for transforming a plurality of volumes into a collection (see FIGS. 3B-C). In accordance with one embodiment, which is a "rackable aggregation arrangement," rack 182 includes a plurality of receptacles (or slots), for example, receptacle R1 of FIG. 3B, and circuitry attached to each receptacle. Each receptacle is configured to accommodate a single storage volume 110. The circuitry is configured to communicate between storage volume 110 and the different functional units. Thus, connecting to rack 182 from a catalog browser 180 enables access to the entire collection catalog and to record user commands on the volume chips 118 of storage volumes 110.

An indication unit in the form of a selection flag 184 is operative to visibly change in response to a signal transmitted to the storage volume 110. Selection flag 184 enables the physical identification of volumes (for example, by illumination) from a collection during a browsing session with catalog browser 180 so that desired storage volumes can be sighted and removed for further utilization with a content appliance 150. The selection flag may be turned on for each volume whose catalog chip has recorded therein at least one user command. Selection flag 184 is attached to the storage shell 122, to a rack slot RI (see FIG. 3B), or to storage body 114. Selection flag 184 may instead indicate the coordinates of a selected volume on a screen of a catalog browser 180. Selection flag 184 may be implemented as an LED (Light Emitting Diode), an LCD (Liquid Crystal display) or a bi-stable display (see FIG. 3A).

In an alternate embodiment, a display 186 can be attached either to volume 110 or to rack 182. Display 186 can be programmed to provide a volume title recorded on volume chip 118.

Optional connector 190 serves to physically connect a plurality of volumes 110 to each other (in a stackable aggregation arrangement) or to a rack 182 (in a rackable aggregation arrangement), as well as to content appliance 150, to user command generator 166, to catalog maker 170 and to catalog browser 180. In a hybrid embodiment, connector 190 provides electrical energy only, while communication between the volumes 110, the rack 182 and the host appliances is executed wirelessly. In a complete wireless embodiment (for example RFID communication) connector 190 may still have a physical role in attaching volumes 110 to each other in a stackable aggregation arrangement or in a rackable aggregation arrangement with no electrical or logical functionality.

The following describes the positioning of volume chip 118 on volume 110. As will be discussed, volume chip 118 may be permanently attached to storage shell 122 or to storage body 114, or it may be reversibly attached to one of storage shell 122 and storage body 114.

FIG. 1A schematically describes an embodiment of volume 110A in which storage body 114A has no volume chip. Instead, storage shell 122A has volume chip 118. Storage shell 122A may be based on conventional designs of CD/DVD jewel cases, magnetic mini-DV boxes or vinyl-record envelopes or may be a flexible envelope or any dedicated design for effectively protecting and handling the storage body 114A during storage and transport. The attachment of volume chip 118 to storage shell 122A can be effected by a variety of techniques and design concepts known in the art and can be made during the production of storage shell 122A or later by applying an appropriate label containing volume chip 118. Volume chip 118 has circuitry 142 (see FIG. 1D) for wireless or wired communication with the functional units. Interface 130 may have physical contacts for allowing effective and convenient connection with storage body 114A, whether it is in or out of storage shell 122A. Such contacts are placed also to allow multiple-volume connection according to the selected aggregation arrangement (see FIGS. 2A-3C).

FIG. 1B schematically describes an embodiment in which volume chip 118 is part of storage body 114B. Such arrangement may be effected by embedding a chip in the central circle of a CD or DVD (and possibly adding the appropriate respective contacts for interface 130 to the spinning part of the CD/DVD drive), or upgrading the 4 KB memory found in magnetic mini-DV cassettes that include a memory-in-cassette (MIC) memory chip to at least the megabyte range. In this embodiment, storage shell 122B may be eliminated when a rackable aggregation arrangement is employed to assemble volumes of a collection. Alternatively, if interface 130 is not a completely contactless link, special holes or conductors can be added to storage shell 122B to allow communication with volume chip 118 when volume 110B is aggregated with other volumes to form part of a collection.

The embodiments of FIGS. 1A and 1B may be implemented with volume chip 118 supplied as a sticker or an electronic label. The sticker/label is attached to the storage shell or to the storage body.

FIG. 1C represents two embodiments where volume chip 118C is reversibly attached to either storage body 114C or to storage shell 122C. In both embodiments, volume chip 118C is detached from storage body 114C or from storage shell 122C and is connected to user command generator 166 to record user commands (or optionally to catalog maker 170 to record the catalog of storage body 114C). Then, volume chip 118C is reattached to storage body 114C or to storage shell 122C for storage.

Attributes of the different volume arrangements are summarized as follows: In the embodiment of FIG. 1A, the individual components, storage body 114A and associated recorders/readers, are conventional, which allows cataloging and aggregating existing volumes by replacing the shells. However, this embodiment is less supportive of on-the-fly cataloging (see FIG. 6), because the embodiment requires externally attaching the storage shell 122B to content recorder 160 during content recording. The embodiment of FIG. 1B may be better adapted for on-the-fly cataloging, but it is not as supportive for cataloging existing volumes. This embodiment requires upgrading the memories of MIC mini-DV cassettes and the firmware of the respective recorders. The embodiment of FIG. 1C is adapted for compatibility with existing apparatuses. Thus, a volume chip 118C having a memory card interface can be inserted into a memory card slot of a video camera for on-the-fly cataloging while content is recorded into the DV magnetic tape cassette. Similarly, a volume chip 118C that has a USB connector can be attached to a personal computer for cataloging a respective CD playing in the personal computer under either the offline or on-the-fly embodiment.

FIG. 1D schematically illustrates the content of volume chip 118. Volume chip 118 stores commands 144, volume catalog 140 and an Edition ID 148. Volume chip 118 has circuitry 142 for wireless/wired communication with the functional units. User commands 144 are entered by a user when operating user command generator 166 to define processing requests regarding the content of storage body 114. The user commands are also available to an appropriate content appliance 150 for execution. Volume catalog 140 include data representative of the content pieces stored in storage body 114, such as data extracted from the content of storage body 114 by catalog maker 170, data entered by the user, and data originated by the manufacturer of commercial content or obtained from remote databases. Edition ID 148 is optionally provided by a manufacturer of a commercial volume 110, to uniquely identify the volume content (that is identical for many duplicates forming an edition) for accessing the respecting entry on a remote database (see FIG. 7 and FIG. 8).

The disclosure provides more than just the ability to browse the content of a single CD, DVD or mini-DV cassette, which may be effected by using an electronic reader instead of a mechanical drive, and then recording commands related to that content. The present disclosure enables browsing essentially immediately the content of an ever-growing collection of volumes, and record respective commands, through aggregation arrangements that can turn a plurality of cataloged volumes into a cataloged collection ready to be accessed and browsed for selecting content pieces and defining operations therewith.

FIG. 2A schematically illustrates exemplary volumes devised for stackable aggregation arrangements. Volume 110 may be either volume 110A of FIG. 1A or volume 110B of FIG. 1B. In FIG. 2A, volume 110 is equipped with connectors, in form of Lego-like connectors—male connector 190M and female connector 190F. The male connector 190M and female connector 190F are adapted for mechanical, electrical and logical connection between units stacked one on top of the other (see FIG. 3A). The connectors, four in the illustrated example, suffice to provide both electrical energy (two connectors) and a communication bus (the other two connectors). The communication bus, via the male connectors 190M at the top of the stack or the female connectors 190F at the bottom of the stack, is usable for connecting the stack to a catalog browser 180 and user command generator 166.

Figure 2B:
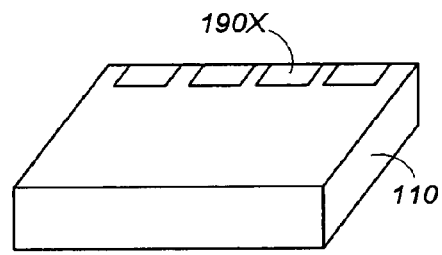
FIG. 2B illustrates exemplary volumes devised for rackable aggregation arrangements.

FIG. 2B schematically illustrates exemplary volumes devised for rackable aggregation arrangements. Volume 110 can be either volume 110A of FIG. 1A or volume 110B of FIG. 1B. In FIG. 2B, flat connectors 190X of volume 110 are adapted for connecting with matching connectors positioned in a rack slot (see FIG. 3B), which also provide electrical power and communication with other catalog browser 180 and user command generator 166.

FIG. 3A illustrates a stackable aggregation arrangement 200A in the form of a stack of a plurality of volumes 110 from FIG. 2A. The male connectors 190M of the top volume 110 (or the female connectors 190F at the bottom volume 110) are used to connect aggregation arrangement 200A to a catalog browser 180 and user command generator 166 (FIG. 1). Additionally, FIG. 3A also shows a selection flag 184 and display 186, which are part of the indicator unit of volume 110. The content of display 186 may be created during the cataloging process of each volume, for example, by the user entering "Trip to Hawaii". The content is stored within volume chip 118 and is displayed when aggregation arrangement 200A is energized. Alternatively, the content in the display remains if a bi-stable display is used for display 186. The selection flag 184 of the pertinent volumes is triggered when content from such volumes is selected for further use while browsing through the collection using catalog browser 180 and user command generator 166. Such triggering facilitates identification of selected volumes for individual use with content appliance 150.

FIG. 3B illustrates a rackable aggregation arrangement 200B that uses a rack 182B, which has a plurality of receptacles (R1) and a communication bus to accommodate a plurality of volumes 110 of the type shown in FIG. 2B. The display 186 and selection flag 184 are as described with respect to FIG. 3A. However, in the rack arrangement, removing a highlighted volume does not turn off other highlighted volumes as might happen with the stacked aggregation arrangement 200A (if bi-stable displays are not used for selection flag 184 in the stacked aggregation arrangement of FIG. 3A). The communication bus provides electrical contacts between the volumes 110 of rack 182C and catalog browser 180. The communication bus forms part of rack 182B and is not shown for clarity.

FIG. 3C illustrates an aggregation arrangement 200C that is similar to that of FIG. 3B, except that display 186 and selection flag 184 are placed next to the receptacles of rack 182C instead of on the volumes as in FIG. 3A and FIG. 3B. Activating display 186A and/or selection flag 184A require additional logic and wiring that form part of rack 182C and/or volume 110. In the embodiment of FIG. 3C, the design burden relates to rack 182C and not to volume 110. Thus commercial implementation of the disclosure may be easier to effect using the embodiment of FIG. 3C.

In accordance with another embodiment of the disclosure, a method of operating a content appliance to interact with the storage volume 110 that includes content in a primary storage device, includes sending to the storage volume a user command relating to that content and storing the user command in the secondary storage device that also forms part of the storage volume. The user command defines a processing request that is related to the digital content stored in the primary storage unit. The method may further include processing the digital data according to the processing request, transmitting a signal to activate an indication unit on the storage volume and illuminate the storage device. The method also includes creating a volume catalog of the digital content.

Figure 4:
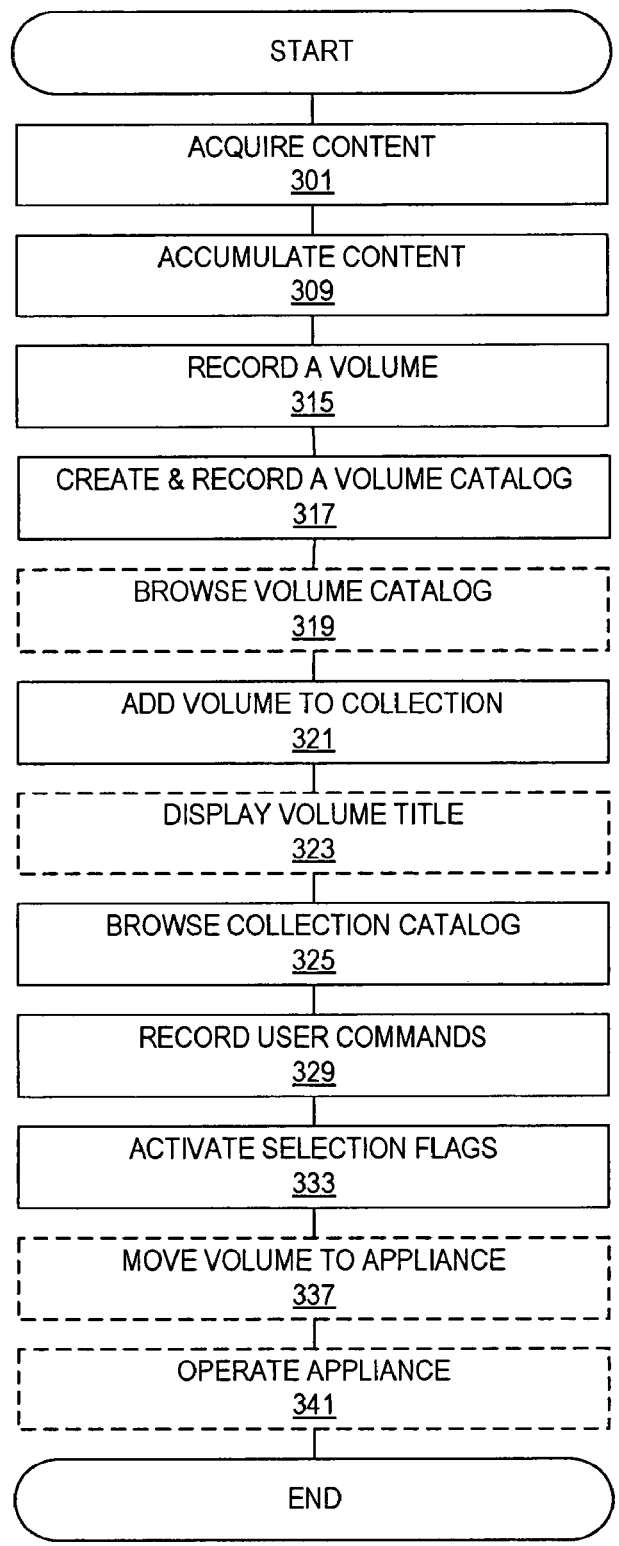
FIG. 4 shows a flow chart of an offline cataloging procedure in accordance with an embodiment of the disclosure.

FIG. 4 describes an offline cataloging procedure in accordance with an embodiment of the disclosure, whereby the volume catalog is generated and recorded onto volume chip 118 when storage body 114 already has content recorded thereon. With reference to step 301, content is acquired, for example, by taking pictures, making movies, writing documents, recording broadcasts, or downloading content pieces from the internet. In a step 309, contents accumulate on, for example, a user's personal computer's disk drive, to reach an appropriate amount for archiving. In step 315, content recorder 160 stores the accumulated content into storage body 114. For example, a personal computer burns a CD to store accumulated content. In the case of a magnetic mini-DV recording where the user wishes to use the original cassette also for archiving (and not burn it onto a DVD), step 315 is unnecessary. In the case of commercial content, step 301 and step 309 are executed using professional equipment and procedures and step 315 is executed in a mass-production facility.

In a step 317, a volume catalog of the content on storage body 114 is created. Volume 110 is connected to catalog maker 170, which scans the content of storage body 114, extracts samples, optionally allows the user to enter titles or comments, and then records the samples and user entries (if applicable), as a catalog onto volume chip 118. For example, if storage body 114 is a CD or DVD, a personal computer prepares the catalog of the CD/DVD content using cataloging software. If storage body 114 is a magnetic mini-DV cassette, a personal computer connected to a digital video camera or player uses movie-editing software to prepare the catalog. If the cataloging is part of a commercial production, step 317 can be implemented in a commercial mass-production facility by storing the same volume catalog in all volume chips 118 of the content of the mass-produced storage bodies 114. However, it will be noted that a mass-produced volume 110 can be commercially recorded via steps 301, 309 and 315 and then cataloged by a user via step 317. After step 317, volume 110 may be removed from catalog maker 170.

Optionally, the volume 110 cataloged in step 317 can be individually connected in a step 319 to a compatible catalog browser 180 to browse the content on volume 110. For example, the content of a mini-DV cassette can be browsed from a personal computer without the need to hook up the computer to a digital video camera or player.

In step 321, the volume is added to a collection using an aggregation arrangement such as 200A of FIG. 3A, 200B of FIG. 3B or 200C of FIG. 3C. The volume chips 118 of all volumes 110 can then be placed in communication simultaneously with catalog browser 180 and user command generator 166.

Optionally, in step 323, a display 186 positioned on or near each volume in the collection shows the volume title. In step 325, the collection is connected to a catalog browser 180 and user command generator 166 to allow a user to browse the collection catalog by accessing the volume chips 118 of all volumes 110 of the collection.

In step 329, the user can activate user command generator 166 to enter user commands that define a processing request related to the content on storage body 114. Exemplary user commands may be "view", "copy", "print 5 copies at 6.times.9 size", "crop according to my simulated example and then print a single copy at 12.times.18 size", etc. The user commands are recorded onto the volume chips 118 of the volumes 110 containing the respective contents.

In step 333, a signal is transmitted to visibly change the indication unit on the selected storage volumes. Logic in volume chip 118, in rack 182C or in catalog browser 180 activates the selection flags of the selected volumes (those that have received in step 329 user commands regarding their content pieces) of the collection. In step 337, the user assisted by the selection flags removes the appropriate volumes from the aggregation arrangement and inserts them one by one into the appropriate content appliances 150. The user may separately connect to content appliance 150 the combination of storage body 114A and storage shell 122A or the combination of storage body 114C and volume chip 118C. In step 341, the appropriate content pieces are processed (for example, accessed, viewed, copied, and/or printed) by content appliance 150 according to the processing requests defined by the user commands recorded into volume chip 118 in step 329.

Figure 5:
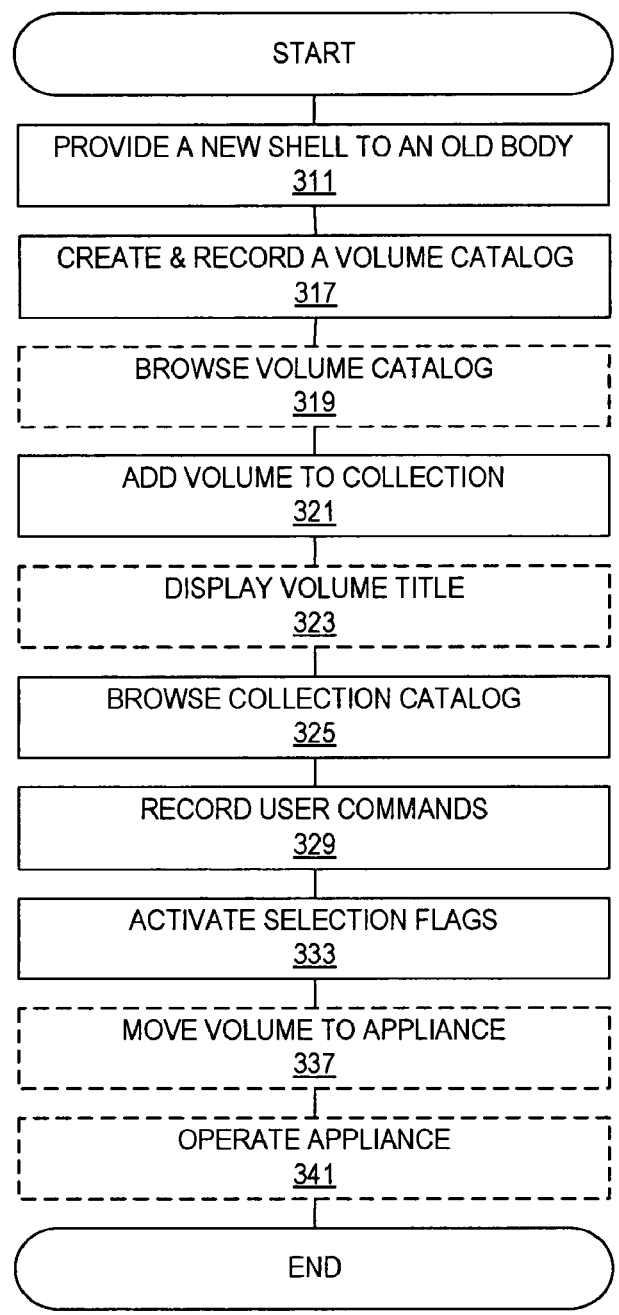
FIG. 5 shows a flow chart of an offline cataloging procedure in accordance with another embodiment of the disclosure.

FIG. 5 describes an offline cataloging procedure in accordance with a second embodiment, whereby the volume catalog made and recorded into volume chip 118 is a catalog of content that has already been stored in storage body 114. This embodiment is similar to that of FIG. 4, but here storage volumes of the prior art are retrofitted in accordance with the present disclosure. Reference is also made to FIG. 1A.

Beginning with step 311, storage body 114A already containing content data (for example, a conventional, user-recorded or commercially-recorded CD, DVD, VHS tape or magnetic mini-DV cassette) receives a new storage shell 122A that includes volume chip 118.

The remaining steps, steps 317-341, are the same as in FIG. 4. Thus, an attribute of the configuration of FIG. 1A is that it can lend itself for cataloging existing volumes of CDs, DVDs, magnetic tape cassettes and vinyl records.

Figure 6:
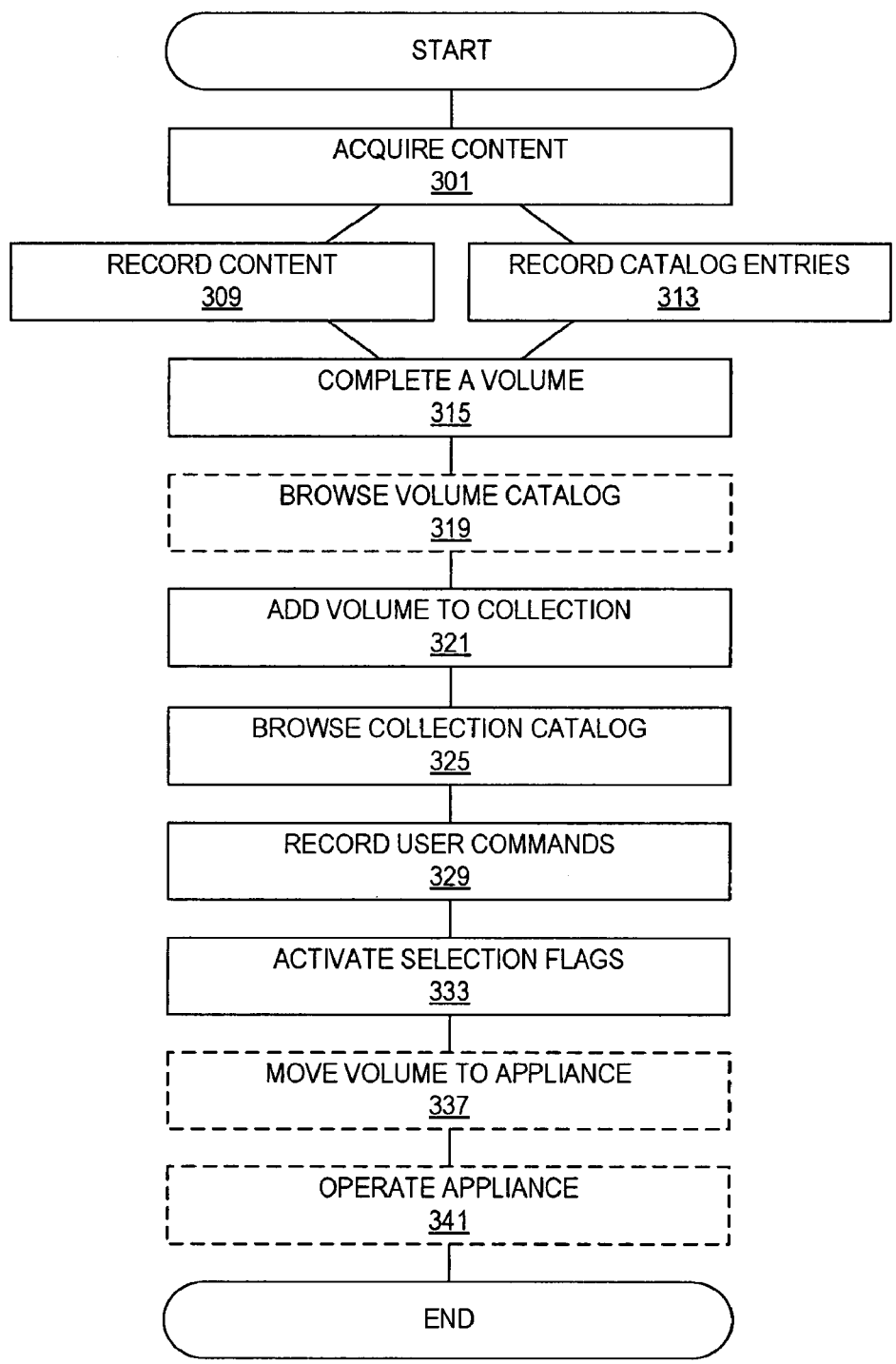
FIG. 6 shows a flow chart of an on-the-fly cataloging procedure in accordance with an embodiment of the disclosure.

FIG. 6 teaches an alternate on-the-fly cataloging procedure, wherein the volume catalog is created and recorded concurrently with the recording of the content. Such procedure may be implemented when a catalog maker is integrated with a content recorder. Because the process requires simultaneous connection of a content recorder with both a storage body and a volume chip, the configuration of FIG. 1B is more suitable, although that of FIG. 1A is also possible by connecting storage shell 122A to an external interface of content recorder 160 (which can be more practical where content recorder 160 is a personal computer and less practical if it is a video camera).

In step 301, an amount of content is acquired by content recorder 160, for example, a folder of digital photos is accessed on the hard disk by a personal computer, or footage is taken by a video camera. In step 309, the content acquired in step 301 is copied into storage body 114, while in a substantially-concurrent step 313, catalog maker 170 extracts from that content the respective samples and records them as a catalog into volume chip 118. Steps 301, 309 and 313 continue until, in step 315, either the current capacity of storage body 114 is exhausted or the user elects to stop recording and remove volume 110 from content recorder 160. The remaining steps (steps 315-341) are as described above with respect to FIG. 4 and FIG. 5. It will be noted that the creation of the catalog (steps 309) and concurrent recording of the content (step 313) are to be understood in the broadest sense, meaning that the content is recorded into storage body 114 and the catalog is recorded into volume chip 118 within the same work session.

Commercial content includes mass-produced, prerecorded CDs, DVDs, magnetic tapes, flash disks and vinyl records that store music, movies, audio books, digital books, artwork pictures, software, graphics, fonts etc. A user may be willing to add such content to his or her collection or even establish a collection composed solely of commercial content. The present disclosure offers a variety of cataloging options for commercial content. The desired cataloging option depends on the nature of the content, the cooperation of the provider with the provisions of the present disclosure, and on the preferences of the user that owns the content. The exemplary embodiments described below cover a variety of situations that are answered by different solutions.

Figure 7:
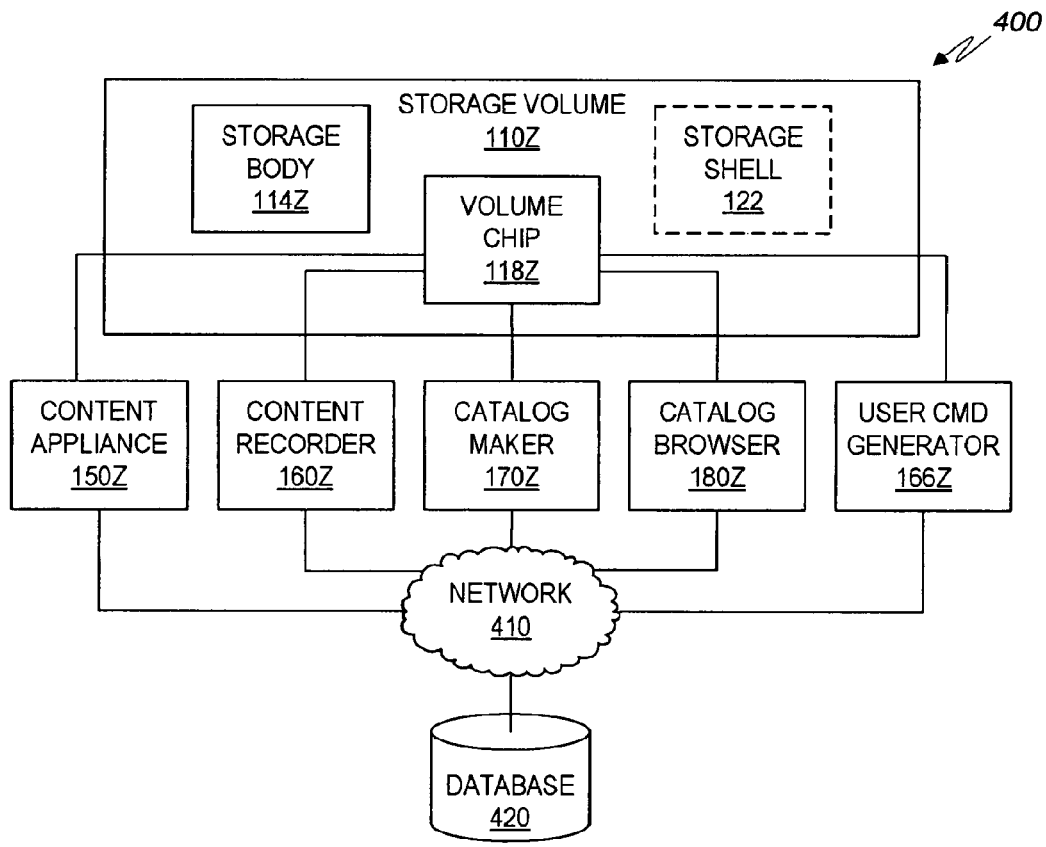
FIG. 7 illustrates another embodiment of a system of the present disclosure.

FIG. 7 describes system 400 that is a variation of system 100 of FIG. 1. Storage body 114Z contains commercially prepared content, which is similar to storage body 114 of FIG. 1, with optionally a manufacturer-complied volume catalog prepared by the manufacturer to be copied by a user to volume chip 118Z. Volume chip 118Z is similar to volume chip 118 of FIG. 1, with optionally a unique edition ID that identifies the content of a mass-produced volume 110Z to associate it with a respective volume catalog that is stored in a remote database accessible via a communication network, for example the Internet or a mobile telephony data network.

Content appliance 150Z, content recorder 160Z, user command generator 166Z, catalog maker 170Z and catalog browser 180Z are similar to their counterparts of FIG. 1, with the addition of connectivity to a database 420 via network 410. Network 410 is a communication network, such as the Internet or mobile data network, to any of content appliance 150Z, content recorder 160Z, user command generator 166Z, catalog maker 170Z and catalog browser 180Z to database 420. Database 420 contains catalog information of commercially-produced content, provided by the manufacturers of such content or by third parties such as user groups. An example of a content catalog for commercial CDs is CDDB™ (CD DataBase), which is an on online music database service available from Gracenote Corp., Emeryville, Calif.

Figure 8:
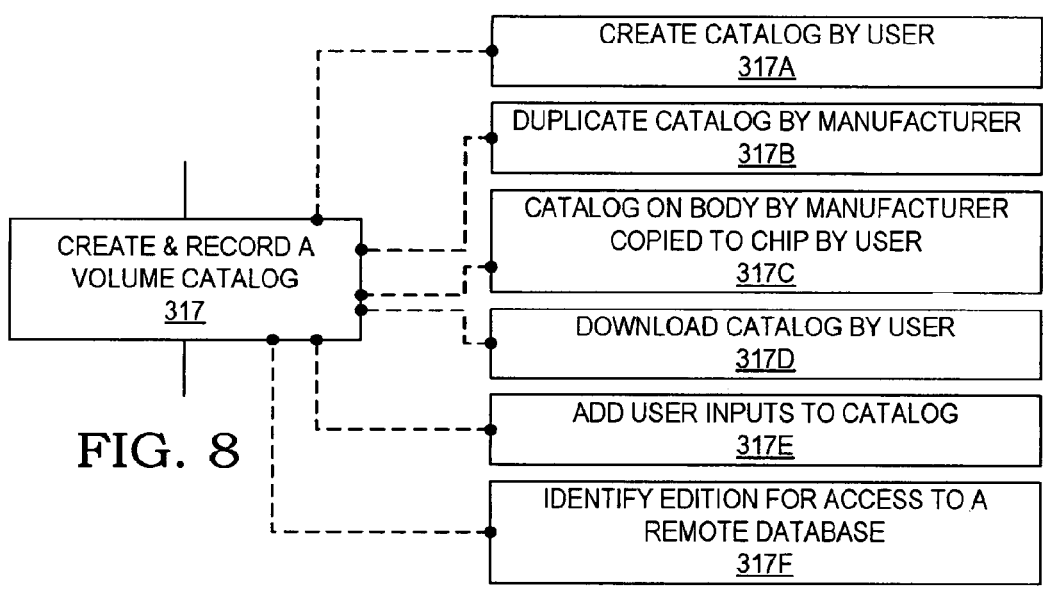
FIG. 8 portrays optional embodiments for recording content of a volume chip when the content stored in a storage body is commercially-produced.

FIG. 8 describes several alternative embodiments for recording the content of volume chip 118Z when the content stored in storage body 114Z is commercially-produced. The presentation is made by describing six variations 317A-F of step 317 of FIG. 4.

Variation 317A treats the commercial content in storage body 114Z as any other previously recorded content, and employs catalog maker 170Z to read the content of storage body 114Z, compile a catalog therefore, and store the catalog in volume chip 118Z. Thus, variation 317A has actually been described in the process of FIG. 4; however, often commercially-manufactured volumes contain extra useful data for a richer catalog than their user-made counterparts. Under variation 317B, catalog maker 170Z is located on the site of the commercial content provider, which compiles the catalog once for each content edition, and then stores a copy of the catalog in volume chip 118Z. Under variation 317C, a catalog is prepared by the provider and added to storage body 114Z; however, because storage body 114Z is inaccessible to the respective aggregation arrangement, the user operates a catalog maker 170Z to copy the catalog from storage body 114Z to volume chip 118Z. In the variation 317C, unlike the variation 317A, in most cases the manufacturer has access to more bibliographic information than can be extracted by a catalog maker 170Z from the content pieces stored in storage body 114Z.

In variation 317D, the catalog of a commercial volume is stored in a remote database 420 by the content provider or by a third party, and is then downloaded by a user of catalog browser 180Z and stored in volume chip 118Z; the commercial volume is identified for locating the appropriate entry in database 420 by methods known in the art for volume identification by reviewing the table of content of commercial storage body 114Z.

Variation 317E is to be combined with any of variations 317B-C to add user inputs to manufacturer-provided catalogs. Two examples for such user inputs are user comments or keywords, and a user instruction to catalog maker 170Z to add ten-second music samples extracted from the beginning each content piece stored in storage body 114Z, to each catalog entry stored in volume chip 118Z.

Variation 317F is aimed at using a volume chip 118Z of minimal capacity that initially contains just the unique identity of the edition of commercial volume 110Z. Instead of storing the user and/or provider catalog on volume chip 118Z, variation 317F relies upon network connectivity of content appliance 150Z and catalog browser 180Z, thus providing the user with a similar experience as in the case where the catalog is stored within volume chip 118Z, while the actual catalog content is retrieved in real-time from database 420. User instructions are recorded in-volume chip 118Z as before.

While the disclosure has been described with respect to a limited number of embodiments, it will be appreciated by persons skilled in the art that the present disclosure is not limited by what has been particularly shown and described hereinabove. Rather, the scope of the present disclosure includes both combinations and sub-combinations of the various features discussed, as well as variations and modifications which would occur to persons skilled in the art.

What is claimed is:

1. A method comprising:
   in a data storage volume that includes a primary storage device and a secondary storage device, performing while the data storage volume is coupled to a first content appliance:
   receiving a command from the first content appliance, wherein the command instructs a second content appliance to perform an operation with respect to a content item stored at the primary storage device to modify the content item; and
   storing the command at the secondary storage device, wherein the command is configured to be sent to and executed by the second content appliance when the data storage volume is coupled to the second content appliance, and
   wherein the second content appliance is distinct from the first content appliance.

2. The method of claim 1, further comprising:
   creating a catalog of content stored at the primary storage device; and
   storing the catalog at the secondary storage device.

3. The method of claim 2, wherein the catalog includes a plurality of samples extracted from the content, and wherein the catalog further includes metadata associated with the content.

4. The method of claim 1, wherein the command includes a command to copy the content item, a command to back up the content item, a command to burn the content item to an optical disc, or any combination thereof.

5. The method of claim 1, wherein the command includes a command to view the content item, a command to display the content item, a command to open the content item, a command to play the content item, a command to process the content item, a command to publish the content item, or any combination thereof.

6. A data storage apparatus comprising:
   a primary storage device including a first non-volatile memory configured to store a content item; and
   a secondary storage device including a second non-volatile memory configured to store a command received from a first content appliance, wherein the command is configured to instruct a second content appliance to perform an operation with respect to the content item stored at the primary storage device to modify the content item,
   wherein the secondary storage device is configured to send the command to the second content appliance for execution, and
   wherein the second content appliance is distinct from the first content appliance.

7. The data storage apparatus of claim 6, wherein the secondary storage device includes an electronic circuit device.

8. The data storage apparatus of claim 6, wherein the primary storage device includes an optical disc, a magnetic disk, or a solid-state device.

9. The data storage apparatus of claim 6, further comprising circuitry configured to support wireless communication with the second content appliance.

10. The data storage apparatus of claim 6, wherein the second non-volatile memory is further configured to store a catalog corresponding to a plurality of content items stored at the first non-volatile memory, wherein the catalog includes a plurality of samples extracted from the plurality of content items, metadata associated with the plurality of content items, or a combination thereof.

11. The data storage apparatus of claim 6, wherein the command includes a command to copy the content item, a command to back up the content item, a command to burn the content item to an optical disc, or any combination thereof.

12. The data storage apparatus of claim 6, wherein the command includes a command to view the content item, a command to display the content item, a command to open the content item, a command to play the content item, a command to process the content item, a command to publish the content item, or any combination thereof.

13. The data storage apparatus of claim 6, wherein the secondary storage device is attached to the primary storage device.

14. The data storage apparatus of claim 6, wherein the secondary storage device is reversibly attachable to the primary storage device.

15. The data storage apparatus of claim 6, wherein the secondary storage device is reversibly attachable to a storage shell of the primary storage device.

16. The data storage apparatus of claim 15, wherein the storage shell comprises an indicator to identify the data storage apparatus, wherein the indicator includes a liquid crystal display or a light emitting diode display.

17. A content appliance comprising:
   a device interface; and
   a processor coupled to the device interface and configured to:
   receive a command of a second content appliance that is distinct from the content appliance, wherein the command is received while the device interface is operatively coupled to a data storage device having a primary storage device that stores a content item and a secondary storage device that stores the command, wherein the command is configured to instruct the content appliance to perform an operation with respect to the content item stored at the primary storage device to modify the content item; and execute the command to perform the operation with respect to the content item stored at the primary storage device.

18. The content appliance of claim 17, further comprising a rack including a plurality of receptacles, and wherein at least a particular receptacle of the plurality of receptacles is configured to receive the data storage device.

19. The method of claim 1, wherein the command identifies a processing request associated with the content item, and further comprising sending the command to the second content appliance for execution by the second content appliance.

20. The method of claim 19, wherein the processing request includes a request to print the content item, and wherein the second content appliance includes a printer.

21. The method of claim 1, wherein the operation includes a task specified by a user, and wherein storing the command at the secondary storage device enables the second content appliance to perform the task instead of the first content appliance performing the task.

22. The data storage apparatus of claim 6, wherein the primary storage device includes a first non-volatile random access memory, wherein the secondary storage device includes a second non-volatile random access memory, and wherein the primary storage device is coupled to the secondary storage device.

23. The data storage apparatus of claim 6, wherein the command indicates the content item.

* * * * *